May 21, 1929.  P. RICHERT  1,714,190
MOUNTING FOR TAXIMETERS
Filed June 2, 1926   2 Sheets-Sheet 1
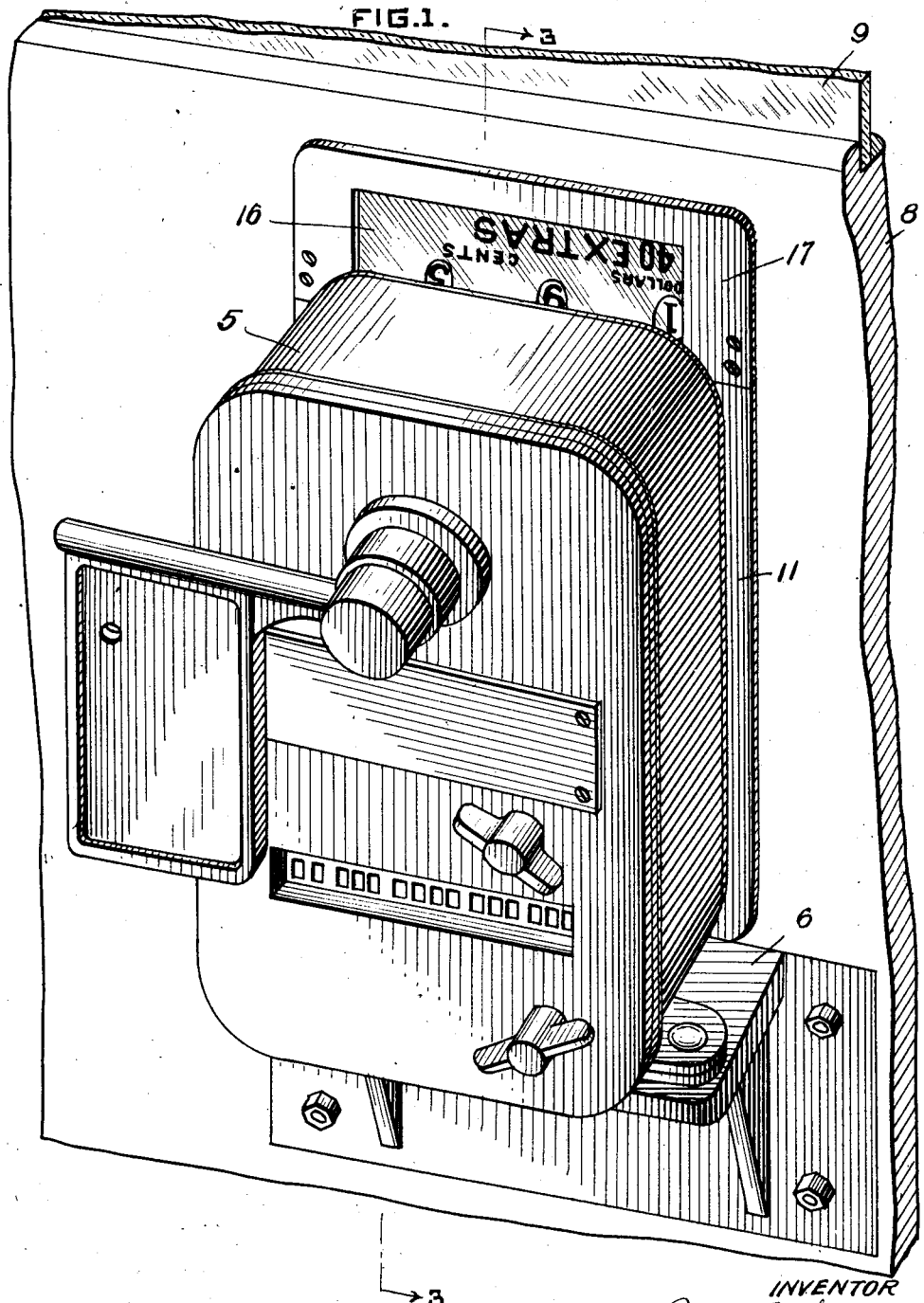

May 21, 1929.　　　　P. RICHERT　　　　1,714,190
MOUNTING FOR TAXIMETERS
Filed June 2, 1926　　　2 Sheets-Sheet 2
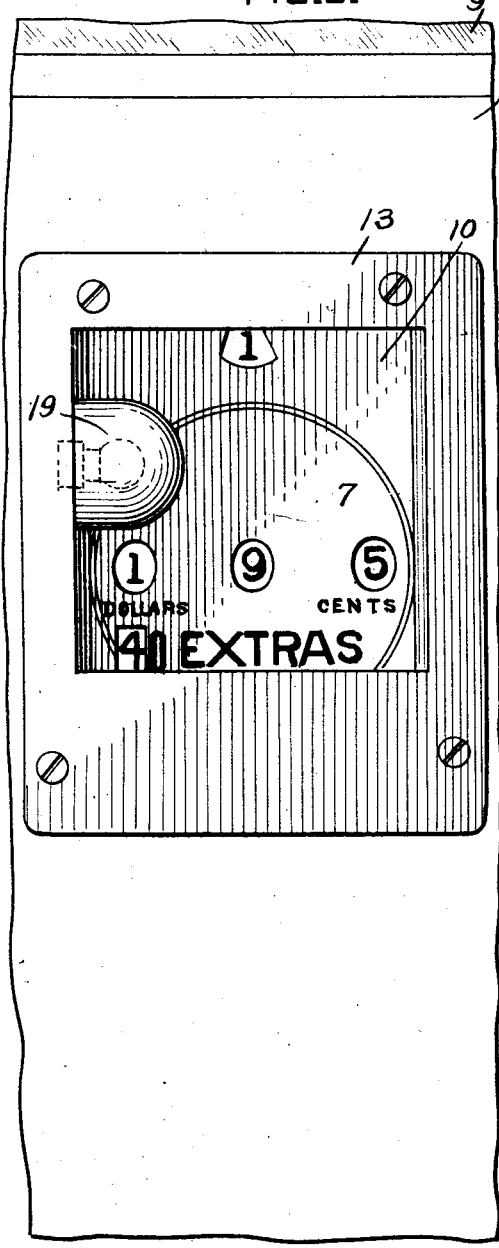
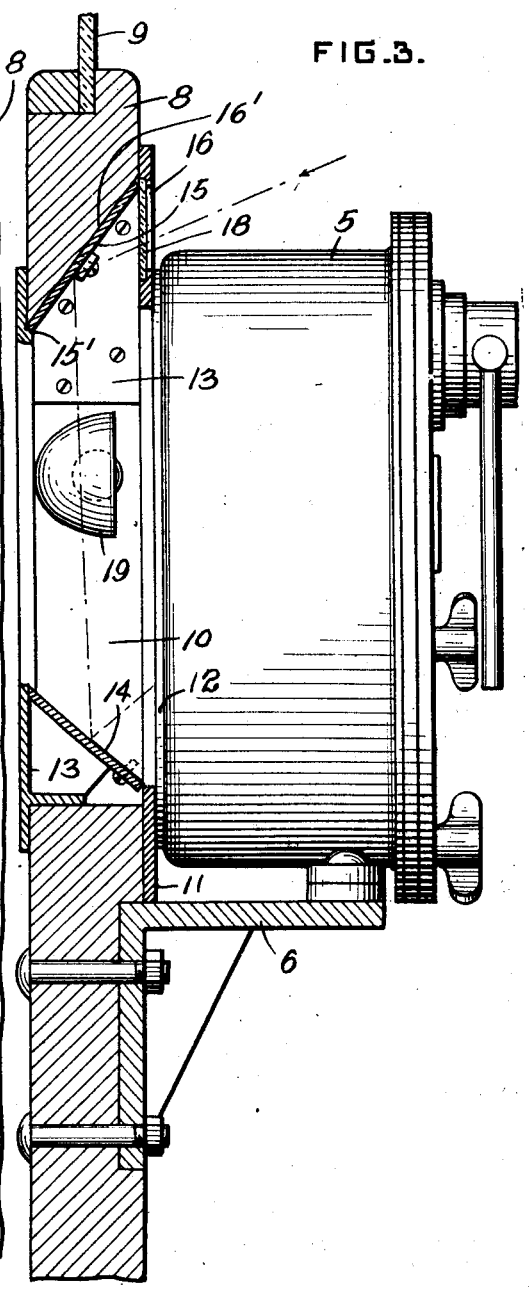
WITNESSES
INVENTOR
Paul Richert Patented May 21, 1929.

1,714,190

UNITED STATES PATENT OFFICE.

PAUL RICHERT, OF NEW YORK, N. Y., ASSIGNOR TO PITTSBURGH TAXIMETER COMPANY, A CORPORATION OF PENNSYLVANIA.

MOUNTING FOR TAXIMETERS.

Application filed June 2, 1926. Serial No. 113,159.

This invention relates to taximeters and more particularly to an improved arrangement for rendering visible the fare registered by the meter.

In modern cabs the meter is, in effect, built into the cab as a part thereof. It is generally supported with its face held flat against the wall or partition between the passenger's and driver's compartments, and an opening is formed in the wall so that the fare registered by the meter is visible from the passenger's compartment. Obviously, with such a construction the fare can be read only from the latter compartment so that it is necessary for the driver to leave his seat and at least partially enter the passenger's compartment to see the amount of fare registered. This is a great inconvenience in the heavy traffic encountered in congested sections and an attempt has been made to overcome the difficulty by providing meters with additional fare indicating devices which are visible from the driver's seat and which are provided in addition to the regular fare indicating devices on the face of the meter. Such an expedient, however, unnecessarily increases the complexity of the already intricate meter mechanism.

An object of this invention is to provide an improved arrangement for rendering the fare registered by taximeters visible from the driver's seat.

A further object is to provide a device of the type set forth which is simple in construction, and easy and cheap to manufacture.

These and other objects which will be apparent to those skilled in this particular art are accomplished by means of this invention, one embodiment of which is illustrated in the accompanying drawings, in which Figure 1 is a perspective view of a taximeter provided with one form of this invention, Fig. 2 is a view of the taximeter face as seen from the passenger's compartment of the cab and Fig. 3 is a sectional view on the line 3—3 of Fig. 1.

The particular embodiment of this invention which has been chosen for illustration is shown in the drawings in connection with a so called built-in form of taximeter support generally found in modern cabs. Ordinarily, a meter 5 of any desired construction is secured to a support such as a bracket 6 with its face 7 flat against the wall or partition 8 separating the passenger's compartment from the driver's compartment below the usual glass window 9. The partition is provided with an opening 10 through which the face of the meter is visible from the passenger's compartment or seat, as is well known in modern taxicab construction, and a frame 11 surrounds the opening and is provided with an annular gasket 12 for cushioning the meter face.

As above indicated, with such a construction it is necessary for the driver to leave his seat in order to read the fare registered by the meter. In order to overcome this necessity the present invention provides a device for rendering the fare visible from the driver's seat.

As illustrated, this device includes an annular frame 13 which is received within the opening 10 and which is provided with an inclined reflector or mirror 14, see Fig. 3, mounted in slots in the sides of the frame so as to extend across the lower portion of the opening beneath the face of the meter. A second inclined reflector 15 is supported in a bracket 15' on the top of the frame so as to extend across the upper portion of the opening above the meter face and a sight opening 16 is provided through which the upper reflector is visible from the driver's seat. As illustrated, the sight opening is formed by extending the opening 10 above the confines of the meter. An inclined surface 16' is thus formed along the top of the opening providing a backing for the upper reflector. Obviously, any desired means can be provided for accomplishing the same functions. As illustrated, the sight opening is surrounded by a frame 17 mounted on top of the frame 11 and provided with a glass partition 18.

It will be apparent that the provision of two reflecting mirrors will produce an inverted image of the fare in the upper mirror so that it is in the proper position to be read by the driver merely by leaning over to a position where he can see the registered fare as reflected in the upper mirror. Obviously, it is not essential that the particular arrangement of reflecting surfaces illustrated be used but various modifications thereof will be apparent. The frame 13 is provided with a light shield 19 for covering the light used to illuminate the meter face and to prevent its shining into the passanger's compartment.

Although I have described a specific embodiment of this invention it will be apparent that various changes, additions, substitutions and omissions can be made therein without departing from the spirit of the invention or the scope of the appended claims.

What I claim as new and desire to secure by Letters Patent is:

1. The combination in a taxicab having a partition between the driver's and passenger's compartments provided with an opening therethrough, of means for supporting a taximeter with the face thereof positioned so as to be visible from the passenger's compartment through said opening, a frame associated with said opening and having a slot for positioning an inclined mirror across the lower portion thereof, means for supporting a second mirror on said frame across the top of said opening and a sight opening for rendering said second mirror visible from the driver's compartment.

2. The combination with a cab having a partition separating the driver's and passenger's compartments therein, of a taximeter located in the driver's compartment, a bracket on said partition for supporting said taximeter so that the face thereof is visible from said passenger's compartment through an opening in said partition and means located in said opening for reflecting the face of the meter so as to render the same visible from the driver's compartment through an extension of said opening projected above the meter.

3. The combination with a cab, of a taximeter, a partition separating the driver's and passenger's compartments of said cab and having an opening formed therein, means for supporting said taximeter in said driver's compartment so that the face of said meter is visible through said opening from the passenger's compartment, said opening being extended above the top of said meter and reflecting means associated therewith so as to render the face of said meter visible from the driver's compartment through the extension of said opening.

In testimony whereof, I have hereunto subscribed my name this 28th day of May, 1926.

PAUL RICHERT.